United States Patent
Hiller

(10) Patent No.: US 7,577,008 B2
(45) Date of Patent: Aug. 18, 2009

(54) CONVERTER CIRCUIT COMPRISING DISTRIBUTED ENERGY STORES

(75) Inventor: Marc Hiller, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/065,349

(22) PCT Filed: Aug. 2, 2006

(86) PCT No.: PCT/EP2006/064925

§ 371 (c)(1),
(2), (4) Date: Feb. 29, 2008

(87) PCT Pub. No.: WO2007/025828

PCT Pub. Date: Mar. 8, 2007

(65) Prior Publication Data

US 2008/0198630 A1 Aug. 21, 2008

(30) Foreign Application Priority Data

Aug. 30, 2005 (DE) .................. 10 2005 041 087

(51) Int. Cl.
*H02M 7/5387* (2007.01)
*H02M 3/24* (2006.01)
(52) U.S. Cl. .................. 363/132; 363/99; 363/136; 363/71
(58) Field of Classification Search ............ 363/29–31, 363/71, 98, 99, 132, 136, 137, 138
See application file for complete search history.

(56) References Cited

U.S. PATENT DOCUMENTS

| | | | |
|---|---|---|---|
| 6,259,616 B1 * | 7/2001 | Ekwall et al. | 363/132 |
| 6,480,403 B1 * | 11/2002 | Bijlenga | 363/98 |
| 6,519,169 B1 * | 2/2003 | Asplund et al. | 363/132 |
| 6,898,095 B2 * | 5/2005 | Bijlenga et al. | 363/132 |
| 7,269,037 B2 * | 9/2007 | Marquardt | 363/71 |
| 2004/0024937 A1 | 2/2004 | Duncan et al. | |

FOREIGN PATENT DOCUMENTS

| | | |
|---|---|---|
| DE | 101 03 031 A1 | 7/2002 |
| DE | 102 17 889 A1 | 11/2003 |
| DE | 103 23 220 A1 | 12/2004 |

* cited by examiner

*Primary Examiner*—Jessica Han
(74) *Attorney, Agent, or Firm*—Henry M. Feiereisen; Ursula B. Day

(57) ABSTRACT

The invention relates to a converter circuit comprising at least one phase module (100) having an upper and a lower converter valve (T1, . . . , T6), wherein each converter valve (TI, . . . , T6) has at least one two-pole subsystem. According to the invention, each two-pole subsystem (14) has four semiconductor switches (21, 23, 25, 27), which can be switched off and are connected electrically in series, four diodes (22, 24, 26, 28), which are each connected electrically back-to-back in parallel with one semiconductor switch (21, 23, 25, 27) which can be switched off, two unipolar storage capacitors (29, 30), which are connected electrically in series and in parallel with the series circuit comprising the semiconductor switches (21, 23, 25, 27), and an electronic system (32), whose reference potential connection (M) is electrically conductively connected to a common potential (P0). This results in a subsystem (14), at whose connection terminals (X2, XI) it is possible to generate a terminal voltage (UX21) having four potential stages, which requires only one electronic system (32), whose energy supply takes place symmetrically, and which does not require any increased complexity in terms of potential isolation.

20 Claims, 4 Drawing Sheets

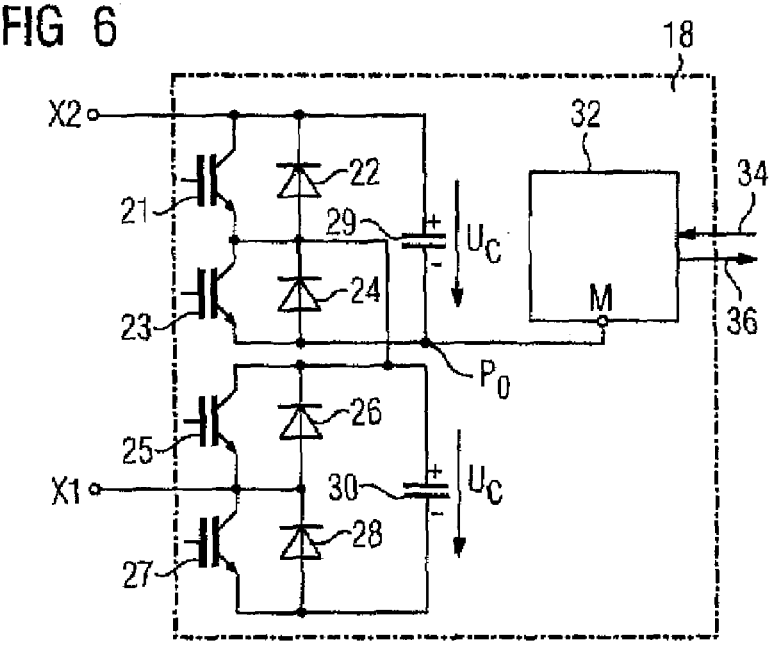
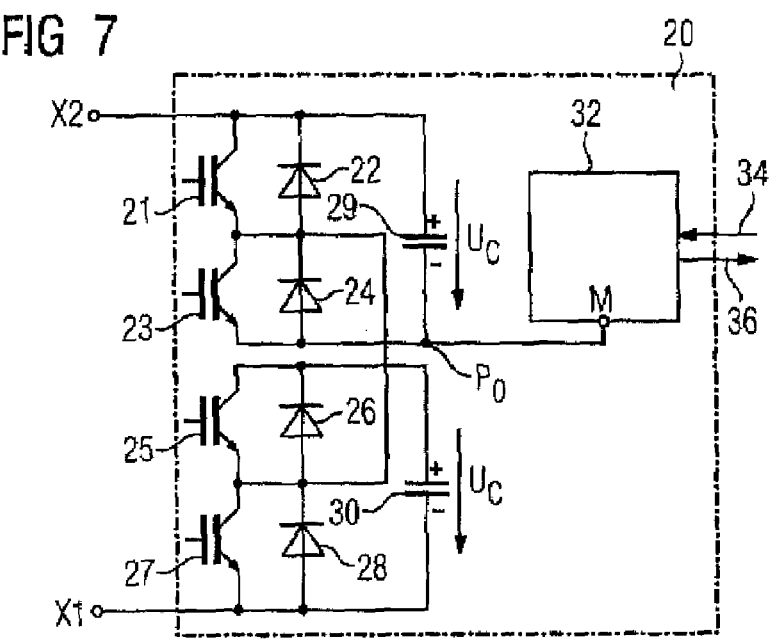

CONVERTER CIRCUIT COMPRISING DISTRIBUTED ENERGY STORES

BACKGROUND OF THE INVENTION

The invention relates to a converter circuit.

A converter circuit of this type is disclosed in DE 101 03 031 A1, and an equivalent circuit of such a converter circuit is shown in greater detail in FIG. 1. As shown in this equivalent circuit, this known converter circuit comprises three phase modules, each of which are denoted by 100. These phase modules 100 are each electrically connected on the DC side to a positive and a negative DC busbar $P_0$ and $N_0$. A DC voltage, which is not described in further detail, lies across these two DC busbars $P_0$ and $N_0$. Each phase module 100 comprises an upper and a lower converter valve T1 or T3 or T5 and T2 or T4 or T6 respectively. Each of these converter valves T1 to T6 comprises a number of two-terminal subsystems 11 electrically connected in series. Four of these subsystems 11 are shown in this equivalent circuit. Two-terminal subsystems 12 (FIG. 3) can also be electrically connected in series in place of the two-terminal subsystems 11 (FIG. 2). Each node between two converter valves T1 and T2 or T3 and T4 or T5 and T6 of a phase module 100 forms an AC-side terminal L1 or L2 or L3 respectively of this phase module 100. Since in this diagram the converter circuit has three phase modules 100, a three-phase load, for example an AC motor can be connected to its AC-side terminals L1, L2 and L3, also known as load terminals.

FIG. 2 shows in greater detail an equivalent circuit of a known embodiment of a two-terminal subsystem 11. The circuit arrangement of FIG. 3 shows a version that is completely identical in function, which is also disclosed in DE 101 03 031 A1. These known two-terminal subsystems 11 and 12 each comprise two turn-off capable semiconductor switches 1, 3 and 5, 7, two diodes 2, 4 and 6, 8 and one unipolar capacitor 9 and 10. The two turn-off capable semiconductor switches 1 and 3 or 5 and 7 respectively are electrically connected in series, with these series connections being electrically connected in parallel with one storage capacitor 9 or 10 respectively. Each turn-off capable semiconductor switch 1 and 3 or 5 and 7 respectively is electrically connected in parallel with one of the two diodes 2, 4 and 6, 8 in such a way that this diode is connected in antiparallel with the corresponding turn-off capable semiconductor switch 1, 3, 5 or 7. The unipolar storage capacitor 9 of the subsystem 11 or 12 respectively comprises either one capacitor or a capacitor bank containing a plurality of such capacitors having a resultant capacitance $C_0$. The junction between the emitter of the respective turn-off capable semiconductor switch 1 or 5 and the anode of the respective diode 2 or 6 forms a connecting terminal X1 of the subsystem 11 or 12. The junction between the two turn-off capable semiconductor switches 1 and 3 and the two diodes 2 and 4 form a second connecting terminal X2 of the subsystem 11. The junction between the collector terminal of the turn-off capable semiconductor switch 5 and the cathode of the diode 6 forms a second connecting terminal X2 of the subsystem 12.

In both diagrams of the embodiments of the two subsystems 11 and 12, insulated gate bipolar transistors (IGBT) are used as the turn-off capable semiconductor switches 1 and 3 as shown in FIGS. 2 and 3. MOS field effect transistors, also known as MOSFETs, can also be used. In addition, gate turn-off thyristors, also known as GTO thyristors, or integrated gate commutated thyristors (IGCT) can be used as the turn-off capable semiconductor switches 1 and 3.

According to DE 101 03 031 A1, the subsystems 11 or 12 of each phase module 100 of the converter circuit shown in FIG. 1 can be driven in a control state I and II. In control state I, the respective turn-off capable semiconductor switch 1 or 5 is switched on, and the respective turn-off capable semiconductor switch 3 or 7 of subsystem 11 or 12 is switched off. As a result, a terminal voltage $U_{X21}$ of the subsystem 11 or 12 that exists across the connecting terminals X1 and X2 is equal to zero. In control state II, the respective turn-off capable semiconductor switch 1 or 5 is switched off and the respective turn-off capable semiconductor switch 3 or 7 of the subsystem 11 or 12 is switched on. In this control state II, the terminal voltage $U_{X21}$ that exists equals the capacitor voltage $U_C$ across the respective storage capacitor 9 or 10.

As shown in the equivalent circuit of the converter circuit of FIG. 1, this converter circuit comprises eight two-terminal subsystems 11 or 12 per phase module 100, with four per respective converter valve T1, T2 or T3, T4 or T5, T6, these subsystems being electrically connected in series by their connecting terminals X1 and X2. The number of two-terminal subsystems 11 or 12 electrically connected in series depends both on a DC voltage lying between the two DC busbars $P_0$ and $N_0$ and on the turn-off capable semiconductor switches 1, 3, 5 and 7 that are used. Another factor here is to what extent a sinusoidal AC voltage at the AC-side terminal L1, L2 or L3 is supposed to follow a sinusoidal curve.

For the configuration and operation of a converter circuit designed as shown in FIG. 1, it is necessary to use a suitable circuit to drive the respective turn-off capable semiconductor switches 1, 3 or 5, 7 of each two-terminal system 11 or 12, and to acquire various measurements of the two-terminal subsystem 11 or 12, for example the capacitor voltage $U_C$ lying across the respective storage capacitor 9 or 10, and to transfer them to a higher-level converter controller. Hence, each two-terminal subsystem 11 or 12 comprises an electronic circuit, which is not shown explicitly in the diagrams of the subsystems 11 and 12 shown in FIGS. 2 and 3 for reasons of clarity. This electronic circuit, also referred to below as an electronic module, performs the following functions:

- bidirectional communication with the higher-level converter controller
- acquisition of various measurements and status/fault signals
- driving the turn-off capable semiconductor switches 1, 3 or 5, 7
- processing all incoming and outgoing signals.

In addition, it is advantageous but not essential to tap the power for operating the electronic module of a two-terminal subsystem 11 or 12 directly from its respective storage capacitor 9 or 10. If two optical fibers are used for the data transmission between the electronic module of each two-terminal subsystem 11 or 12 and the higher-level converter controller, then this operation is electrically isolated. The reference potential of the electronic module of each two-terminal subsystem 11 or 12 is generally connected to a negative terminal of its respective unipolar storage capacitor 9 or 10.

When a plurality of two-terminal subsystems 11 or 12 are connected in series for a phase module of a converter circuit, one embodiment is generally used for the subsystems 11 or 12, i.e. the phase modules 100 of the converter circuit shown in FIG. 1 comprise either subsystems in the embodiment of FIG. 2, or subsystems in the embodiment shown in FIG. 3. For a three-phase converter circuit according to FIG. 1, forty-eight optical fibers must be run between a higher-level converter controller and the twenty-four two-terminal subsystems 11 or 12. If the number of two-terminal subsystems 11 or 12 used is increased by one subsystem per converter system T1, ..., T6, the number of optical fibers increases by 12.

In order to reduce this outlay, the number of electronic modules per converter valve T1, ... T6 must be reduced. This reduction can be achieved if, for example, two two-terminal subsystems 11 or 12 are combined into one subsystem module, it then being possible to combine two electronic modules into one. When using one electronic module for at least two two-terminal subsystems 11 or 12 combined into one subsystem module, the question of the power supply for this electronic module arises. If the required power is only tapped from one unipolar storage capacitor of at least two two-terminal subsystems 11 or 12 combined into a subsystem module, then the power is supplied asymmetrically. Once again, this results in greater outlay for providing electrical isolation for driving the respective turn-off capable semiconductor switches 1, 3 or 5, 7 of the combined subsystems 11 or 12 and for acquiring the capacitor voltages $U_C$, and results in a disadvantageous, asymmetric voltage division.

By combining at least two two-terminal subsystems 11 or 12 in such a way in one subsystem module, the number of optical fibers used is halved, but this is paid for by more costly electrical isolation and involves an asymmetric power supply. This means that two subsystems of simple design are replaced in each case by one subsystem module of more complex design.

SUMMARY OF THE INVENTION

Hence the object of the invention is to define a two-terminal subsystem for a converter circuit that avoids the cited disadvantages and reduces the outlay for such a converter circuit.

According to one aspect of the invention, this object is achieved by a converter circuit having at least one phase module comprising an upper and a lower converter valve, with each converter valve comprising at least one two-terminal subsystem, wherein each two-terminal subsystem comprises four turn-off capable semiconductor switches, four diodes, two unipolar storage capacitors and an electronic circuit, wherein a diode is electrically connected in antiparallel with each turn-off capable semiconductor switch, wherein these four turn-off capable semiconductor switches are electrically connected in series, wherein the two unipolar storage capacitors are electrically connected in series, with this series connection being electrically connected in parallel with the series connection of the turn-off capable semiconductor switches, wherein each junction between two turn-off capable semiconductor switches forms a respective connecting terminal of the two-terminal subsystem, and wherein a junction between the two storage capacitors that are electrically connected in series is electrically connected to a reference-potential terminal of the electronic circuit.

According to another aspect of the invention, this object is achieved by a converter circuit According at least one chase module comprising an upper and a lower converter valve, with each converter valve comprising at least one two-terminal subsystem, wherein each two-terminal subsystem comprises four turn-off capable semiconductor switches, four diodes, two unipolar storage capacitors and an electronic circuit, wherein a diode is electrically connected in antiparallel with each turn-off capable semiconductor switch, wherein pairs of turn-off capable semiconductor switches are electrically connected in series, wherein each series connection is electrically connected in parallel with a unipolar storage capacitor, wherein a junction between two turn-off capable semiconductor switches of a first series connection forms a connecting terminal of the two-terminal subsystem, with an emitter of a second turn-off capable semiconductor switch of the two turn-off capable semiconductor switches of a second series connection forming a second connecting terminal of the two-terminal subsystem, wherein a junction between two turn-off capable semiconductor switches of the second series connection is electrically connected to an emitter of a second turn-off capable semiconductor switch of the two turn-off capable semiconductor switches of the first series connection, and wherein this junction is electrically connected to a reference-potential terminal of the electronic circuit.

According to yet another aspect of the invention, this object is achieved by a converter circuit having at least one phase module comprising an upper and a lower converter valve, with each converter valve comprising at least one two-terminal subsystem, wherein each two-terminal subsystem comprises four turn-off capable semiconductor switches, four diodes, two unipolar storage capacitors and an electronic circuit, wherein a diode is electrically connected in parallel with each turn-off capable semiconductor switch, wherein pairs of turn-off capable semiconductor switches are electrically connected in series, wherein each series connection is electrically connected in parallel with a unipolar storage capacitor, wherein a junction between two turn-off capable semiconductor switches of a second series connection forms a connecting terminal of the two-terminal subsystem, with a collector of a first turn-off capable semiconductor switch of the two turn-off capable semiconductor switches of a first series connection forming a second connecting terminal of the subsystem, and wherein a junction between two turn-off capable semiconductor switches of the first series connection is electrically connected to a collector of a first turn-off capable semiconductor switch of the two turn-off capable semiconductor switches of the second series connection, and wherein this junction is electrically connected to a reference-potential terminal (M) of the electronic circuit.

According to still another aspect of the invention, this object is achieved by a converter circuit having at least one phase module comprising an upper and a lower converter valve, with each converter valve comprising at least one two-terminal subsystem, wherein each two-terminal subsystem comprises four turn-off capable semiconductor switches, four diodes, two unipolar capacitors and an electronic circuit, wherein a diode is electrically connected in antiparallel with each turn-off capable semiconductor switch, wherein pairs of turn-off capable semiconductor switches are electrically connected in series, wherein each series connection is electrically connected in parallel with a unipolar storage capacitor, wherein the junctions between each pair of turn-off capable semiconductor switches are connected together, wherein a collector of a first turn-off capable semiconductor switch of a first series connection and an emitter of a second turn-off capable semiconductor switch of a second series connection form a respective connecting terminal of the two-terminal subsystem, and wherein a reference-potential terminal of the electronic circuit is electrically connected to an emitter of a second turn-off capable semiconductor swich of the first series connection.

The fact that, according to the invention, four turn-off capable semiconductor switches are connected in a circuit of associated diodes connected in antiparallel and two unipolar capacitors, means that a common electronic module can be used to drive these turn-off capable semiconductor switches and to acquire the capacitor voltages, without needing to accept an increased outlay for the electrical isolation. In addition, the power can also be tapped symmetrically. From the outside, such a subsystem according to the invention has two connecting terminals and two terminals for two optical fibers. Hence this subsystem according to the invention is equivalent to a known system in terms of the connections. This subsystem can be driven so that a terminal voltage is generated across the two connecting terminals that now has four potential levels instead of just two potential levels. Hence only half so many subsystems compared with a known embodiment are required for a converter circuit for a defined high voltage, with the number of optical fibers required also being halved.

BRIEF DESCRIPTION OF THE DRAWING

The invention is explained in greater detail with reference to the drawing, which illustrates schematically a plurality of embodiments of a two-terminal system according to the invention.

FIG. 6 shows an equivalent circuit of a third embodiment of a two-terminal subsystem according to the invention, and FIG. 7 shows an equivalent circuit of a fourth embodiment of a two-terminal subsystem according to the invention.

DETAILED DESCRIPTION OF PREFERRED EMBODIMENTS

Figure 1:
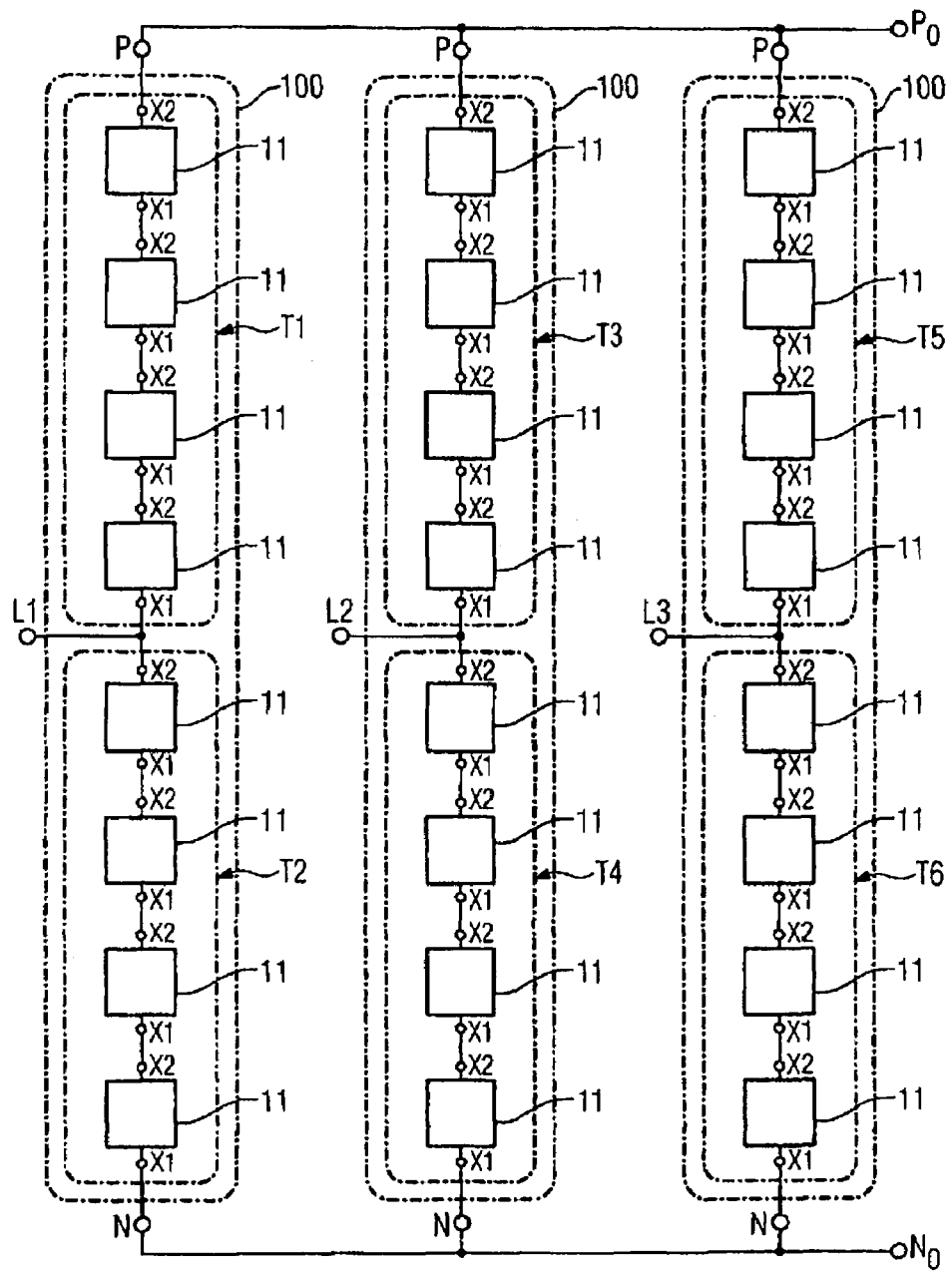
FIG. 1 shows an equivalent circuit of a known converter circuit comprising distributed energy stores, FIGS. 2 and 3 each show in greater detail an equivalent circuit of a first and second embodiment of a known two-terminal subsystem.
Figure 2:
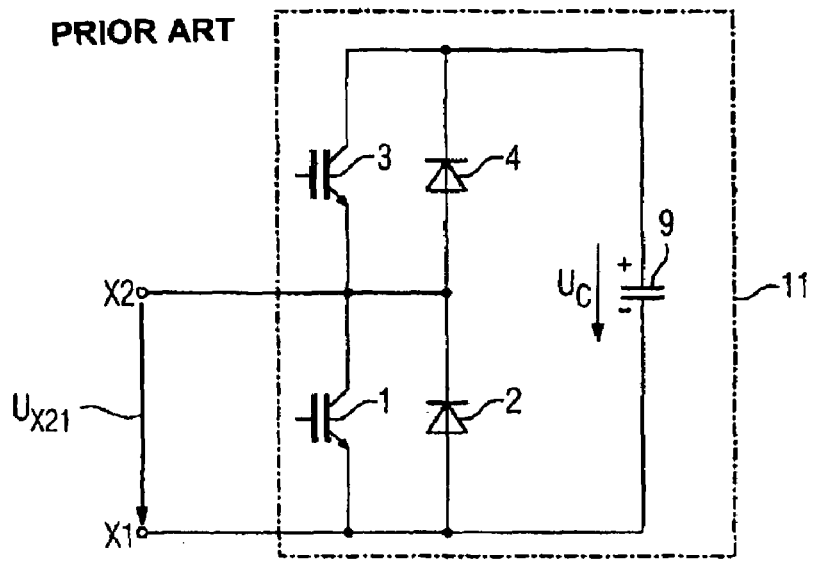
Figure 3:
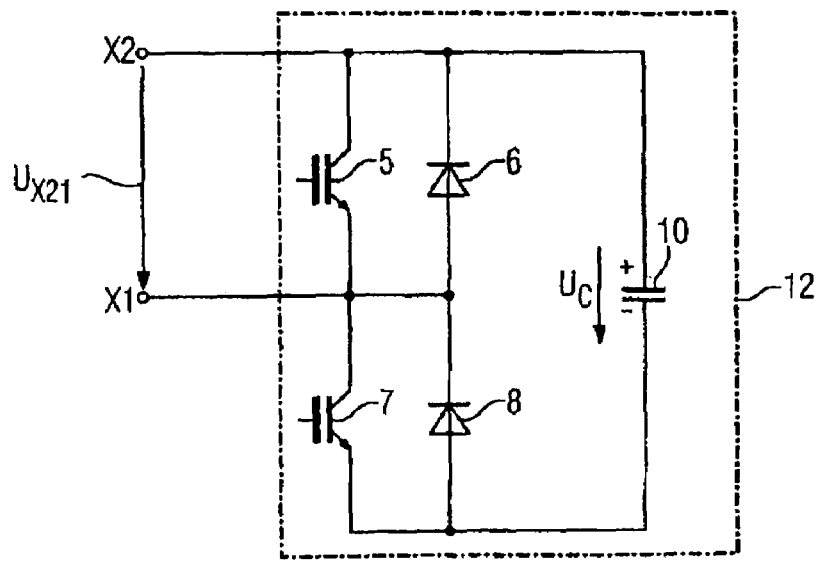
Figure 4:
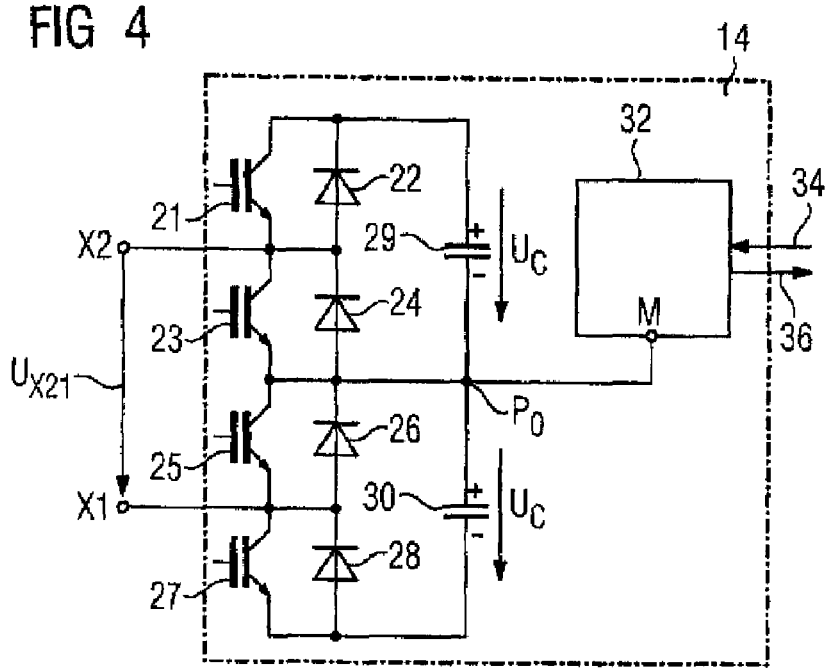
FIG. 4 shows an equivalent circuit of a first embodiment of a two-terminal subsystem according to the invention.

FIG. 4 shows in greater detail the equivalent circuit of a first embodiment of a subsystem 14 according to the invention. This two-terminal subsystem 14 according to the invention comprises four turn-off capable semiconductor switches 21, 23, 25 and 27, four diodes 22, 24, 26 and 28, two unipolar capacitors 29 and 30 and one electronic circuit 32, also referred to below as an electronic module 32. The four turn-off capable semiconductor switches 21, 23, 25 and 27 are electrically connected in series. A diode 22, 24, 26 and 28 is electrically connected in antiparallel with each of these semiconductor switches 21, 23, 25 and 27. One unipolar capacitor 29 or 30 respectively is electrically connected in parallel with each pair of turn-off capable semiconductor switches 21, 23 or 25, 27 respectively. The unipolar capacitor 29 or 30 of this subsystem 14 comprises either one capacitor or a capacitor bank containing a plurality of such capacitors having a resultant capacitance $C_0$. The junction between the two turn-off capable semiconductor switches 21 and 23 and the two diodes 22 and 24 form a second connecting terminal X2 of the subsystem 14. The junction between the two turn-off capable semiconductor switches 25 and 27 and the two diodes 26 and 28 form a first connecting terminal X1 of this subsystem 14. The junction between the emitter of the turn-off capable semiconductor switch 23, the collector of the turn-off capable semiconductor switch 25, the anode of the diode 24, the cathode of the diode 26, the negative terminal of the unipolar capacitor 29 and the positive terminal of the unipolar capacitor 30 forms a common potential $P_0$, which is electrically connected to a reference-potential terminal M of the electronic module 32. This electronic module 32 is linked to a higher-level converter controller (not shown in greater detail) by two optical fibers 34 and 36 in a manner allowing signal transmission.

The common potential $P_0$ is used as the reference potential for the electronic module 32. The fundamental principle in selecting reference potentials is to select those potentials that do not produce unnecessarily high voltage stresses for driver chips of the turn-off capable semiconductor switches 21, 23, 25 and 27 or of the module packages for these turn-off capable semiconductor switches 21, 23, 25 and 27.

This subsystem 14 according to the invention can be driven into four control states I, II, III and IV. In control state I, the turn-off capable semiconductor switches 21 and 25 are switched on, and the turn-off capable semiconductor switches 23 and 27 are switched off. As a result, a terminal voltage $U_{X21}$ across the connecting terminals X2 and X1 of the subsystem 14 equals the capacitor voltage $U_C$ across the capacitor 29. In control state II, the turn-off capable semiconductor switches 21 and 27 are switched on, whereas the turn-off capable semiconductor switches 23 and 25 are switched off. The terminal voltage $U_{X21}$ of the subsystem 14 now equals the sum of the capacitor voltages $U_C$ across the unipolar capacitors 29 and 30. In control state III, the turn-off capable semiconductor switches 23 and 25 are switched on and the turn-off capable semiconductor switches 21 and 27 are switched off. In this control state, the terminal voltage $U_{X21}$ of the subsystem 14 equals zero. In control state IV, the turn-off capable semiconductor switches 23 and 27 are switched on, whereas the turn-off capable semiconductor switches 21 and 25 are switched off. As a result, the terminal voltage $U_{X21}$ of the subsystem 14 changes from potential level "zero" to potential level "capacitor voltage $U_C$", which lies across the unipolar capacitor 30. In control state I or IV, the energy store 29 or 30 receives or releases energy depending on a current direction across the terminals. In control state II, the capacitors 29 and 30 receive or release energy depending on a current direction across the terminals. In a control state III ("zero"), the energy in the capacitors 29 and 30 remains constant. Hence, in terms of functionality, this subsystem 14 according to the invention is equivalent to connecting in series the known subsystem 11 and the known subsystem 12. In contrast, however, this subsystem 14 according to the invention does not have the disadvantages of such a series connection.

When the two known subsystems 11 and 12 are connected in series, each subsystem 11 and 12 also has its own reference potential and its own electronic module. If only one of these two electronic modules is to be used, and the power for this electronic module is only to be tapped from one corresponding capacitor, the power is tapped asymmetrically and creates asymmetries in the voltage division. In addition, a greater outlay must be made for electrical isolation for driving the turn-off capable semiconductor switches and acquiring the capacitor voltages. These disadvantages no longer arise with the two-terminal subsystem 14 embodied according to the invention.

Figure 5:
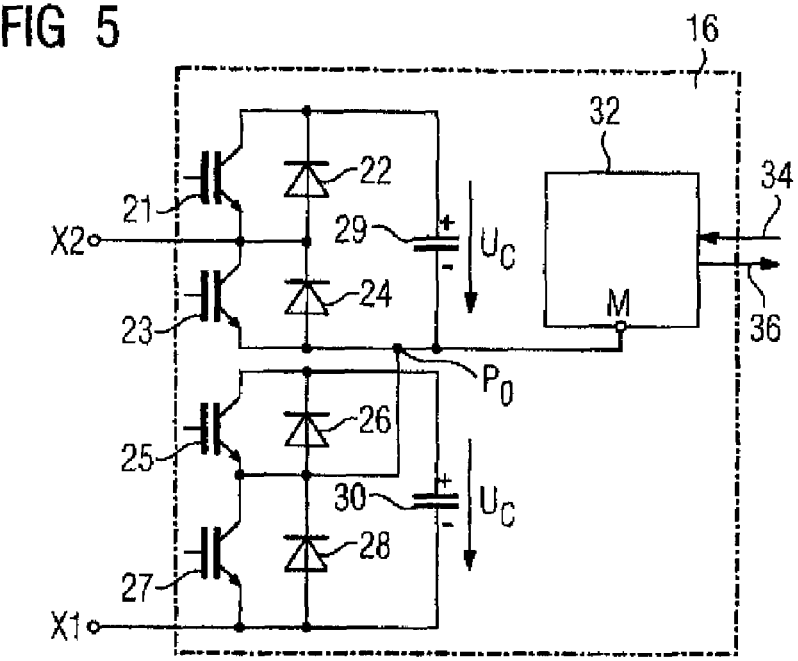
FIG. 5 shows an equivalent circuit of a second embodiment of a two-terminal subsystem according to the invention.

FIG. 5 shows an equivalent circuit of a second embodiment of a two-terminal subsystem 16 according to the invention. This subsystem 16 differs from the subsystem 14 shown in FIG. 4 in that just pairs of turn-off capable semiconductor switches 21, 23 and 25, 27 are electrically connected in series. As in subsystem 14, a diode 22, 24, 26 and 28 is electrically connected in antiparallel with each turn-off capable semiconductor switch 21, 23, 25 and 27. A respective unipolar capacitor 29 or 30 is electrically connected in parallel with each series connection. The junction between the emitter of the turn-off capable semiconductor switch 23, the anode of the diode 24 and the negative terminal of the unipolar capacitor 29 is electrically connected to a junction between the two turn-off capable semiconductor switches 25, 27 that are electrically connected in series. This junction forms a common potential P₀, to which the reference-potential terminal M of the electronic module 32 is electrically connected. In addition, the junction between the emitter of the turn-off capable semiconductor switch 27, the anode of the diode 28 and the negative terminal of the unipolar capacitor 30 forms the connecting terminal X1 of the subsystem 16. Hence, in terms of functionality, this embodiment of the two-terminal subsystem 16 is equivalent to connecting in series the two known subsystems 11. Instead of using the negative terminal of the capacitor 29 as the reference potential for the electronic module 32, other terminals can also be used as the reference potential. The fundamental principle in selecting reference potentials is to select those potentials that do not produce unnecessarily high voltage stress for the driver chips of the turn-off capable semiconductor switches 21, 23, 25 and 27 or of their module packages.

In a third embodiment of the two-terminal subsystem 18 according to the invention, in the same way as in the subsystem 16 shown in FIG. 5, pairs of turn-off capable semiconductor switches 21, 23 and 25, 27 are electrically connected in series. Unlike the subsystem 16, the junction between the two turn-off capable semiconductor switches 21 and 23 that are electrically connected in series is now electrically connected to a junction between the collector of the turn-off capable semiconductor switch 25, the cathode of the diode 26 and the positive terminal of the capacitor 30. The junction between the two turn-off capable semiconductor switches 25 and 27 that are electrically connected in series now forms a first connecting terminal X1, whereas the junction between the collector of the turn-off capable semiconductor switch 21, the cathode of the diode 22 and the positive terminal of the capacitor 29 forms a second connecting terminal X2 of this subsystem 18. As in the subsystem 16, the negative terminal of the unipolar capacitor 29 is again provided as the reference potential for the electronic module 32 of this subsystem 18. In terms of functionality, this subsystem 18 is equivalent to connecting in series the two known subsystems 12.

In the two-terminal subsystem 20 corresponding to the equivalent circuit shown in FIG. 7, once again, pairs of the four turn-off capable semiconductor switches 21, 23 and 25, 27 are electrically connected in series, with a diode 22, 24, 26 and 28 being electrically connected in antiparallel with each turn-off capable semiconductor switch 21, . . . , 27. A respective capacitor 29 or 30 is electrically connected in parallel with a series connection of the turn-off capable semiconductor switches 21, 23 or 25, 27. The junction between the two turn-off capable semiconductor switches 21 and 23 that are electrically connected in series is electrically connected to the junction between the two turn-off capable semiconductor switches 25 and 27 that are electrically connected in series. The junction between the collector of the turn-off capable semiconductor switch 21, the cathode of the diode 22 and the positive terminal of the capacitor 29 forms a second connecting terminal X2 in this subsystem 20. The junction between the emitter of the turn-off capable semiconductor switch 27, the anode of the diode 28 and the negative terminal of the capacitor 30 forms a first connecting terminal X1 of the subsystem 20. In terms of functionality, this subsystem 20 is equivalent to connecting in series a known subsystem 12 with a known subsystem 11.

By means of this embodiment according to the invention of the subsystems 14, 16, 28 and 20 for a converter circuit for high voltages, in particular in the field of drive technology and power engineering, the number of optical fibers between a converter circuit, comprising a multiplicity of series-connected subsystems, and a higher-level converter controller, is halved compared with a known converter circuit for high voltages. Each subsystem can be driven in such a way that a terminal voltage $U_{X21}$ appears across its connecting terminals X2, X1 that can assume four different potential levels. Such a terminal voltage $U_{X21}$ can only be achieved with conventional subsystems 11 and 12 if two series-connected subsystems 11, 12 or 12, 12 or 11, 11 or 12, 11 are used. Compared with merely connecting in series two known subsystems 11 and 12, with these being housed in one module, the subsystem 14 or 16 or 18 or 20 according to the invention requires just one electronic module 32, and, in addition, its power can be supplied symmetrically from the capacitors 29 and 30. As a result, no further outlay is required for electrical isolation for the drive and for acquiring a capacitor voltage $U_C$.

What is claimed is:

1. A converter circuit, comprising at least one phase module having two serially connected converter valves, each converter valve comprising:

at least one two-terminal subsystem having a first pair of turn-off semiconductor switches connected in series at a first connection point to form a first connecting terminal of the subsystem, and a second pair of turn-off semiconductor switches connected in series at a second connection point to form a second connecting terminal of the subsystem;

four diodes connected antiparallel with the turn-off semiconductor switches in one-to-one correspondence, with the first and second pair of the turn-off semiconductor switches being connected in series at a third connection point defining a reference potential;

a first unipolar storage capacitor connected in parallel with the first pair of the turn-off semiconductor switches;

a second unipolar storage capacitor connected in parallel with the second pair of the turn-off semiconductor switches; and an electronic circuit connected to the reference potential, said electronic circuit operating the turn-off semiconductor switches.

2. The converter circuit of claim 1, wherein the turn-off semiconductor switch is implemented as an insulated gate bipolar transistor.

3. The converter circuit of claim 1, wherein the turn-off semiconductor switch is implemented as a MOS field effect transistor.

4. The converter circuit of claim 1, wherein the turn-off semiconductor switch is implemented as a gate turn-off thyristor.

5. The converter circuit of claim 1, wherein the turn-off semiconductor switch is implemented as an integrated gate commutated thyristor.

6. A converter circuit, comprising at least one phase module having two serially connected converter valves, each converter valve comprising:

at least one two-terminal subsystem having a first pair of turn-off semiconductor switches connected in series at a first connection point to form a first connecting terminal of the subsystem, and a second pair of turn-off semiconductor switches connected in series at a second connection point which is connected to an unconnected emitter of the first pair of turn-off semiconductor switches to form a reference potential, with an unconnected emitter of the second pair of turn-off semiconductor switches forming a second connecting terminal of the subsystem;

four diodes connected antiparallel with the turn-off semiconductor switches in one-to-one correspondence;

a first unipolar storage capacitor connected in parallel with the first pair of the turn-off semiconductor switches;

a second unipolar storage capacitor connected in parallel with the second pair of the turn-off semiconductor switches; and an electronic circuit connected to the reference potential, said electronic circuit operating the turn-off semiconductor switches.

7. The converter circuit of claim 6, wherein the turn-off semiconductor switch is implemented as an insulated gate bipolar transistor.

8. The converter circuit of claim 6, wherein the turn-off semiconductor switch is implemented as a MOS field effect transistor.

9. The converter circuit of claim 6, wherein the turn-off semiconductor switch is implemented as a gate turn-off thyristor.

10. The converter circuit of claim 6, wherein the turn-off semiconductor switch is implemented as an integrated gate commutated thyristor.

11. A converter circuit, comprising at least one phase module having two serially connected converter valves, each converter valve comprising:

at least one two-terminal subsystem having a first pair of turn-off semiconductor switches connected in series at a first connection point, with an unconnected emitter of the first pair of turn-off semiconductor switches forming a reference potential and an unconnected collector of the first pair of turn-off semiconductor switches forming a first connecting terminal of the subsystem, and a second pair of turn-off semiconductor switches connected in series at a second connection point to form a second connecting terminal of the subsystem, with an unconnected collector of the second pair of turn-off semiconductor switches being connected to the first connection point;

four diodes connected antiparallel with the turn-off semiconductor switches in one-to-one correspondence;

a first unipolar storage capacitor connected in parallel with the first pair of the turn-off semiconductor switches;

a second unipolar storage capacitor connected in parallel with the second pair of the turn-off semiconductor switches; and an electronic circuit connected to the reference potential, said electronic circuit operating the turn-off semiconductor switches.

12. The converter circuit of claim 11, wherein the turn-off semiconductor switch is implemented as an insulated gate bipolar transistor.

13. The converter circuit of claim 11, wherein the turn-off semiconductor switch is implemented as a MOS field effect transistor.

14. The converter circuit of claim 11, wherein the turn-off semiconductor switch is implemented as a gate turn-off thyristor.

15. The converter circuit of claim 11, wherein the turn-off semiconductor switch is implemented as an integrated gate commutated thyristor.

16. A converter circuit, comprising at least one phase module having two serially connected converter valves, each converter valve comprising:

at least one two-terminal subsystem having a first pair of turn-off semiconductor switches connected in series at a first connection point, with an unconnected emitter of the first pair of turn-off semiconductor switches forming a reference potential and an unconnected collector of the first pair of turn-off semiconductor switches forming a first connecting terminal of the subsystem, and a second pair of turn-off semiconductor switches connected in series at a second connection point which is connected to the first connection point, with an unconnected emitter of the second pair of turn-off semiconductor switches forming a second connecting terminal;

four diodes connected antiparallel with the turn-off semiconductor switches in one-to-one correspondence;

a first unipolar storage capacitor connected in parallel with the first pair of the turn-off semiconductor switches;

a second unipolar storage capacitor connected in parallel with the second pair of the turn-off semiconductor switches; and an electronic circuit connected to the reference potential, said electronic circuit operating the turn-off semiconductor switches.

17. The converter circuit of claim 16, wherein the turn-off semiconductor switch is implemented as an insulated gate bipolar transistor.

18. The converter circuit of claim 16, wherein the turn-off semiconductor switch is implemented as a MOS field effect transistor.

19. The converter circuit of claim 16, wherein the turn-off semiconductor switch is implemented as a gate turn-off thyristor.

20. The converter circuit of claim 16, wherein the turn-off semiconductor switch is implemented as an integrated gate commutated thyristor.

* * * * *